No. 851,108. PATENTED APR. 23, 1907.
C. H. SHULTZ.
METAL SASH BAR.
APPLICATION FILED MAR. 9, 1906.
Fig. 1.
Fig. 2.
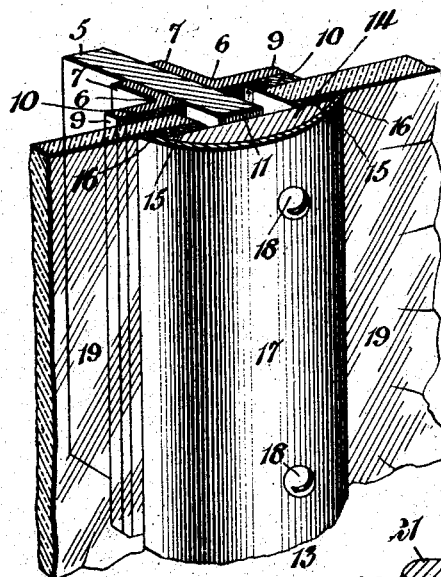
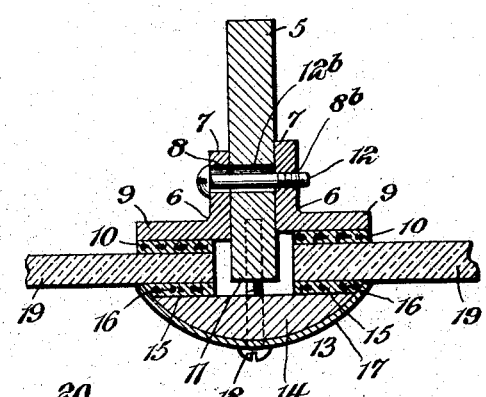
Fig. 3.
Fig. 5.
Fig. 4.
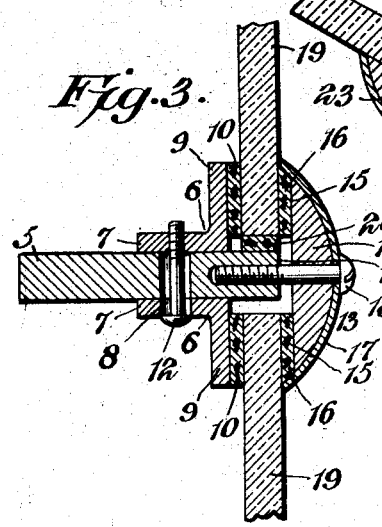
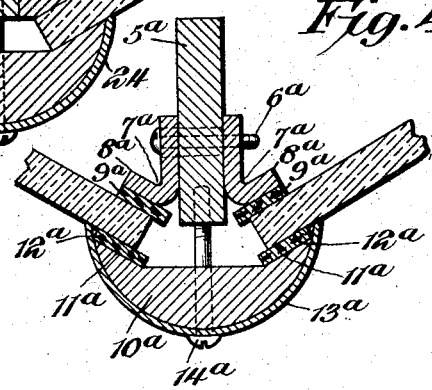
Witnesses
Howard D. Orr.
B. G. Foster
Charles H. Shultz, Inventor,
By E. G. Siggers
Attorney

UNITED STATES PATENT OFFICE.

CHARLES H. SHULTZ, OF ST. JOSEPH, MISSOURI.

METAL SASH-BAR.

No. 851,108.　　　　Specification of Letters Patent.　　Patented April 23, 1907.

Application filed March 9, 1906. Serial No. 305,187.

*To all whom it may concern:*

Be it known that I, CHARLES H. SHULTZ, a citizen of the United States, residing at St. Joseph, in the county of Buchanan and State of Missouri, have invented a new and useful Metal Sash-Bar, of which the following is a specification.

This invention relates to frames for holding glass, and it is clearly applicable for use as corner posts, mullions, transoms, and the like, whether the bars are located vertically or horizontally.

The principal object is to provide a simple, novel and strong bar that will effectually hold the glass without injuring the same, and yet will permit the expansion and contraction thereof, as well as the natural settling of the building, such bar providing a joint that is air, dust, snow and water-proof.

A further and important object is to provide a structure that is readily adjustable to glass of different thicknesses, and may be adjusted to properly clamp the glass where two adjoining panes differ in thickness.

The preferred form of construction is shown in the accompanying drawings, wherein—

Figure 1 is a perspective view of a portion of a vertical bar, showing glass of two thicknesses held thereby. Fig. 2 is a horizontal sectional view through the structure. Fig. 3 is a vertical sectional view, illustrating the arrangement of the parts when the bar is used horizontally, as in transoms. Fig. 4 shows a slight modification of the structure when employed as a corner post. Fig. 5 is a sectional view through another form of the invention.

Similar reference numerals designate corresponding parts in all the figures of the drawing.

In the embodiment illustrated in the first three figures, a frame bar 5 is employed that is preferably constructed of steel, said bar having flat sides, and being disposed transversely of the plane of the window. Located on opposite sides of the frame bar are glass clamping elements preferably comprising angle bars 6 having flanges 7 that bear flat against the opposite faces of the frame bar 5, said flanges being provided with openings 8 and $8^b$. The walls of the opening $8^b$ in one of the flanges being threaded, the other flanges 9 of the clamping bars 6 project outwardly from the frame bar in opposite directions, and have cushions 10 secured to their outer faces, said cushions being preferably composed of cork strips. The glass clamping elements 6 are independently adjustable toward and from the outer edge 11 of the frame bar 5, and are held in their different positions by suitable bolts or screws 12, said screws passing through the openings 8 in one flange through slots $12^b$ formed in the frame bar, and being threaded into the openings $8^b$, the openings 8 are preferably of greater diameter than the shanks of the screws.

A single opposing outer clamping element 13 cooperates with both of the inner clamping elements. This outer element consists of a body 14, preferably, though not necessarily having a curved outer face, and having the margins 15 of its inner side constituting bearings, on which are secured cushions preferably composed of cork strips 16. A metallic cap 17 covers the outer face of the body and also covers the outer edges of the cushion strips 16. Holding bolts or screws 18, passing through the outer member, are threaded into the outer edge portion of the frame bar 5, and thus serve to secure the outer clamping member thereto.

In use, the glass panes as 19 are interposed between the inner clamping elements and the outer element, the former being first adjusted to their proper positions, so that when the outer element is secured in place, the glass will be clamped between the cushions, said glass being preferably spaced from the frame bar so as to allow for the necessary contraction and expansion as well as the settling of the building. It will be observed that as each inner member is independently adjustable, panes of different thicknesses may be placed on opposite sides of the frame bar, and the outer single member will still cooperate and properly clamp both. Thus in the embodiment shown in Figs. 1 and 2 one of the panes 19 is thinner than the other.

The structure illustrated in Fig. 3 is exactly the same as that shown in Figs. 1 and 2, except that the two panes are of the same thickness, and the bar is disposed horizontally. The same reference numerals therefore have been employed, but in this case, the upper pane is preferably seated on a cushion strip 20, secured to the upper side of the frame bar.

By this means, a simple, rigid and novel frame bar is provided, which will effectively hold glass, and will prevent the ingress of air, dust, snow and water. At the same time, if it becomes desirable or necessary to remove a pane, the outer member can be readily detached, so as to release the glass. The particular structure of the outer member is also important, for not only are cushions provided thereon for the glass, but these cushions are covered and protected by the outer metallic cap, and are therefore not exposed to the deleterious influence of the weather. The use of cork as cushions has been found particularly advantageous, not only because of its resilient qualities, but also because it constitutes a very effective closure for the joints and is not as subject to decay as rubber and the like.

A slight modification of the structure is shown in Fig. 4, wherein, the device is employed as a holder for angularly disposed panes. The frame bar is shown at 5ª, and secured to its opposite sides by means of bolts 6ª, are the inner glass clamping elements 7ª, these elements having outstanding angularly disposed flanges 8ª that carry cushions 9ª. The outer element as in the above described embodiment, comprises a body 10ª, provided with marginal bearings 11ª, holding cushions 12ª, the cushions being angularly disposed with respect to each other, and being arranged parallel to the inner cushions 9ª. A cap 13ª covers the body and the outer edges of the cushions 12ª, and holding screws 14ª, passed through the outer elements, are threaded into the edge of the frame bar 5ª. This structure shows how readily the invention can be employed for holding angularly disposed panes, and it will of course be understood that said panes may be curved, or may be set at any angle desired.

Still another embodiment of the invention is disclosed in Fig. 5. In this case, a frame bar is designated 20, and the inner glass clamping elements, as shown at 21, instead of being formed of angle iron, the said elements 21 are preferably formed of wood, and consequently no cork cushions are necessary. These elements 21 are independently adjustable on the bar 20, being clamped thereto and connected to each other by screws 22. The outer element consists of a body 23 of wood, the margins of which clamp against the margins of the glass. This body is covered and protected by a cap 24, and the outer element is connected to the frame bar by screws 25.

From the foregoing, it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In a sash of the character described, the combination with a frame bar, of a glass clamping element adjustably mounted thereon, means for securing the clamping element in different positions upon the bar, an opposing glass clamping element detachably associated with the adjustable element, and means for securing said opposing element to the bar.

2. In a sash of the character described, the combination with a frame bar having a side and an edge, of a glass clamping element adjustably mounted on the side of the frame bar, means for securing the clamping element against movement to the frame bar at different distances from said edge of the bar, an opposing glass clamping element detachably associated with the adjustable element, and means for detachably securing said opposing element to the said edge of the bar.

3. In a sash of the character described, the combination with a frame bar, of a glass clamping element comprising an angle bar, one flange of which is disposed against the frame bar and has a transverse opening therethrough, the other flange projecting from the frame bar and constituting a glass holding flange, a holding device passing through the opening and engaging the bar, and another glass clamping element opposed to said glass holding flange and secured to the frame bar.

4. In a sash of the character described, the combination with a frame bar, of glass clamping elements secured to and independently adjustable upon the frame bar, means for securing the elements against movement on the bar, and an opposing clamping element coacting with said adjustable elements.

5. In a sash of the character described, the combination with a frame bar, of glass clamping elements secured to opposite sides of the bar and independently adjustable thereupon, means for securing the glass clamping elements against movement on the bar, an opposing clamping element coacting with said adjustable elements, and means separate from the first mentioned means for securing the opposing clamping element to the bar.

6. In a sash of the character described, the combination with a frame bar, of glass clamping elements located on opposite sides of the bar, a fastening device connecting the elements and passing through the bar, said device permitting the adjustment of the elements on the bar, and an opposing clamping element coacting with said adjustable elements and secured to the bar.

7. In a sash of the character described, the combination with a frame bar, of glass clamping elements located on opposite sides of the frame bar, said elements being adjustable with respect to the bar and with respect to each other, and a fastening device for the elements connecting the same and passing through the bar.

8. In a sash of the character described, the combination with a frame bar, of clamping elements arranged on opposite sides of the frame bar and comprising angle bars having flanges located against opposite sides of said bar the other flanges projecting outwardly in opposite directions from the frame bar, holding means passing through the frame bar and adjustably engaging the flanges located thereagainst, an opposing clamping element disposed over one edge of the frame bar and having its outer margins arranged in opposing relation to the outstanding flanges of the clamping elements, and fastening means for said opposing element passing therethrough and engaging the edge of the frame bar.

9. In a sash of the character described, the combination with a frame bar, of glass clamping means connected thereto and including a glass clamping element secured thereto and comprising a body, a cushion secured to the outer margin of the body, and a cap covering the body, said cap extending over the outer edge of the cushion and terminating at the juncture of the inner face and outer edge of the cushion.

10. In a sash of the character described, the combination with a frame bar, of glass clamping means associated therewith and including a glass clamping element secured thereto and comprising a body, cushions located on the margins of the body, and a cap covering the outer face of the body, said cap extending over the outer edges of the cushions and body and terminating at the juncture of the inner face and outer edge of the cushion.

11. In a sash of the character described, the combination with a frame bar, of angle bars having certain of their flanges secured to the opposite sides thereof, the other flanges constituting glass clamps cushions located on the outer faces of the angle bars, and a cap bar secured to the edge of the frame bar and having cushions on its margins, which cushions are disposed in opposing relation to the cushions of the angle bars.

12. In a sash of the character described, the combination with a frame bar, of separate clamping elements secured to the opposite sides thereof, cushions of cork located on the outer faces of the elements, a cap bar secured between its margins to the edge of the frame bar between the clamping elements, and cushions of cork located on the inner marginal faces of the cap bar.

In testimony, that I claim the foregoing as my own, I have hereto affixed my signature in the presence of two witnesses.

CHARLES H. SHULTZ.

Witnesses:
WILLIAM F. HASPEL,
AL GALDNER.